United States Patent
Yoshida

(10) Patent No.: US 7,298,380 B2
(45) Date of Patent: Nov. 20, 2007

(54) IMAGE PROCESSING METHOD AND APPARATUS FOR WHITE EYE CORRECTION

(75) Inventor: Ikuko Yoshida, Arida (JP)

(73) Assignee: Noritsu Koki Co., Ltd., Wakayama-ken (JP)

(*) Notice: Subject to any disclaimer, the term of this patent is extended or adjusted under 35 U.S.C. 154(b) by 380 days.

(21) Appl. No.: 11/114,835

(22) Filed: Apr. 26, 2005

(65) Prior Publication Data

US 2005/0238230 A1 Oct. 27, 2005

(30) Foreign Application Priority Data

Apr. 26, 2004 (JP) ............................. 2004-130151

(51) Int. Cl.
*G06K 9/00* (2006.01)
*G09G 5/00* (2006.01)
*G03F 3/08* (2006.01)
*H04N 1/46* (2006.01)
*G09G 5/02* (2006.01)
*H04N 9/64* (2006.01)

(52) U.S. Cl. ............... 345/590; 345/617; 348/576; 358/518; 358/520; 358/1.1; 358/537; 382/162; 382/167

(58) Field of Classification Search ............... 345/589, 345/597, 600, 616–618; 348/78, 251, 576–578, 348/660; 358/515–520, 1.1, 3.27, 536–537; 382/162, 167
See application file for complete search history.

(56) References Cited

U.S. PATENT DOCUMENTS

2005/0117173 A1* 6/2005 Kugo .................... 358/1.1

FOREIGN PATENT DOCUMENTS

JP 2002-247596 8/2002

* cited by examiner

*Primary Examiner*—Wesner Sajous
(74) *Attorney, Agent, or Firm*—Fulbright & Jaworski LLP

(57) ABSTRACT

A technique for correcting white eye in image data is disclosed. In this technique, a white eye candidate pixel is detected from an eye extracted from the image data based on a predetermined detection condition. The white eye candidate pixel as a white eye pixel based on a predetermined determination condition. Then, white eye correction is effected on the determined white eye pixel by changing its luminance.

13 Claims, 7 Drawing Sheets

IMAGE PROCESSING METHOD AND APPARATUS FOR WHITE EYE CORRECTION

This application claims priority from JP2004-130151 filed Apr. 26, 2004 herein incorporated by reference in its entirety.

FIELD OF THE INVENTION

The present invention relates to an image processing technique for correcting or improving a white eye representation in image data.

DESCRIPTION OF THE RELATED ART

Recently, with ever increasing popularity of digital cameras as well as film scanners, a photographic image of a photographic film is often digitized for its processing. As a result, correction or retouching operation of a photography which conventionally required an experienced or professional skill can now be realized also with an inexpensive processing apparatus such as an apparatus commonly known as "digital mini-lab" for producing photo prints.

For example, in flash pictures of such subject as a human or an animal, there can occur a so-called red eye phenomenon resulting from reflection of the flash light off the blood vessels of the retina of the subject's eyes, causing the center of the eye to appear red or in a color different from the actual color thereof. Various and numerous solutions have been proposed to tackle this problem by means of image processing technique. According to a technique disclosed by Japanese Patent Application "Kokai" No. 2002-247596 (paragraphs [0041] through [0046] and [0071] through [0075]), for example, from a specified eye area, a red eye area is determined which has predetermined characteristic amounts such as hue, chroma, luminance. Then, the red eye area thus determined is corrected by being completely replaced by black color which is believed most similar to the color of the iris or by reducing values of R components (reducing their lightness) of pixel values of R, G, B image data.

More recently, there has been an increasing demand for correction other than the red eye correction described above. In particular, in a portrait photography for use in e.g. a certificate, a face of the photographic human subject appears large in the photo and eyes of the subject give strong visual impression. Hence, it is strongly desired to improve the visual impression of the eyes, such as aesthetic improvement of white eye representation. However, the art has not yet come up with any method for enabling such correction or an apparatus for implementing such method.

SUMMARY OF THE INVENTION

The present invention has been made to address to the above-described state of the art. A primary object of the present invention is to provide a technique capable of extracting pixels of white eye areas and correcting the white eye areas to an appropriate color.

For accomplishing the above-noted object, according to one aspect of the present invention, there is proposed a method for correcting white eye in image data, comprising the steps of detecting a white eye candidate pixel from an eye extracted from the image data based on a predetermined detection condition;

determining said white eye candidate pixel as a white eye pixel based on a predetermined determination condition; and effecting white eye correction of the determined white eye pixel by changing its luminance.

With the above construction, the white eye correction is effected not on all pixels (white eye candidate pixels) detected based on the predetermined detection condition from the extracted image data, but on those limited pixels which have been determined as white eye pixels based on the predetermined determination condition. Hence, this method can effect the white eye correction in a reliable manner by avoiding erroneous color correction of e.g. the skin around the eye.

According to one preferred embodiment of the invention, the above method further comprises the step of detecting an iris from the image data, and at said white eye pixel determining step, said white eye candidate pixel is determined as the white eye pixel if said white eye candidate pixel has been detected from an area adjacent said iris.

With the above construction, first, an iris is detected from the image data. Then, a white eye candidate pixel is determined as a white eye pixel only if this candidate pixel has been detected from an area adjacent the iris. Hence, the determination of white eye pixel can be made with higher reliability, without erroneous determination of a pixel from e.g. the skin around the eye as a white eye pixel. Further, a pixel which is present within the area adjacent the iris, but not detected as a white eye candidate pixel as failing to satisfy the predetermined detection condition due to e.g. a noise can be "recovered" and appropriately determined a white eye candidate pixel, then as a white eye pixel.

Preferably, in the above-described construction, said white eye correcting step is effected by changing a chroma of the white eye pixel first prior to the change of its luminance.

With the above construction, the method changes the chroma before changing the luminance. Hence, the tint of the white eye portion can be corrected to be similar to an achromatic color. By subsequently effecting the luminance on this achromatic side, the subsequent monochromatic correction of the white eye by the change of luminance can be carried out more effectively.

Preferably, in the above-described construction, the white eye correcting step is effected by changing a hue of the white eye pixel.

This construction allows correction to such hue as can improve aesthetic impression of the white color. Hence, the white eye correction can be carried out even more effectively.

Further, in the white eye correcting method of the invention, the white eye correcting step effects the white eye correction by a ratio determined based on a difference between a predetermined pixel value of a target pixel and a pixel value of each white eye pixel.

With the above construction, the white eye correction can be made with maintaining e.g. the so-called gradation due to difference in the pixel value of each white eye pixel. Therefore, the white eye correction can be made not to provide unnatural impression, but by an appropriate degree to provide a natural visual impression.

Still preferably, in the white eye correcting method of the invention, said predetermined detection condition employed at said step of detecting a white eye candidate pixel is predetermined based on a luminance distribution of the image data.

With this construction, as the white eye candidate pixel is detected based on the condition predetermined on the luminance distribution of the image data, the white eye candidate pixel can be detected based on a condition which is variable to suits each particular image data, in comparison with detection of a white eye candidate pixel based on a uniformly fixed threshold value. For instance, if the image data has high luminance as a whole, its luminance distribution too is concentrated on the higher luminance side. Hence, the predetermined luminance value as the detection threshold can be set to a higher luminance (brighter) side than usual. Conversely, if the image data has low luminance as a whole, the predetermined luminance value as the detection threshold can be set to a lower luminance side (darker) than usual. In these manners, the detection condition for the white eye candidate pixel can vary according to each particular image data. As a result, the white eye correction can be made more appropriately and reliably.

According to further aspects of the present invention, there are proposed a program for causing a computer to execute the above-described white eye correcting method of the invention and a medium storing such program therein.

Namely, the program causes a computer to carry out the functions of detecting a white eye candidate pixel from an eye extracted from the image data based on a predetermined detection condition; determining said white eye candidate pixel as a white eye pixel based on a predetermined determination condition; and effecting white eye correction of the determined white eye pixel by changing its luminance.

According to a still further aspect of the present invention, there is proposed an image processing apparatus for implementing the above-described white eye correcting method. This apparatus comprises:

a white eye candidate pixel detecting section for detecting a white eye candidate pixel from an eye extracted from the image data based on a predetermined detection condition a white eye pixel determining section for determining said white eye candidate pixel as a white eye pixel based on a predetermined determination condition; and a white eye correcting section for effecting white eye correction of the determined white eye pixel by changing its luminance.

Needless to say, such program and image processing apparatus can achieve the same functions and effects as the above-described white eye correcting method of the invention.

Further and other features and advantages of the invention will become apparent upon reading the following detailed description of preferred embodiments thereof with reference to the accompanying drawings.

DESCRIPTION OF THE PREFERRED EMBODIMENTS

Preferred embodiments of the present invention will be described in details with reference to the accompanying drawings.

Figure 1:
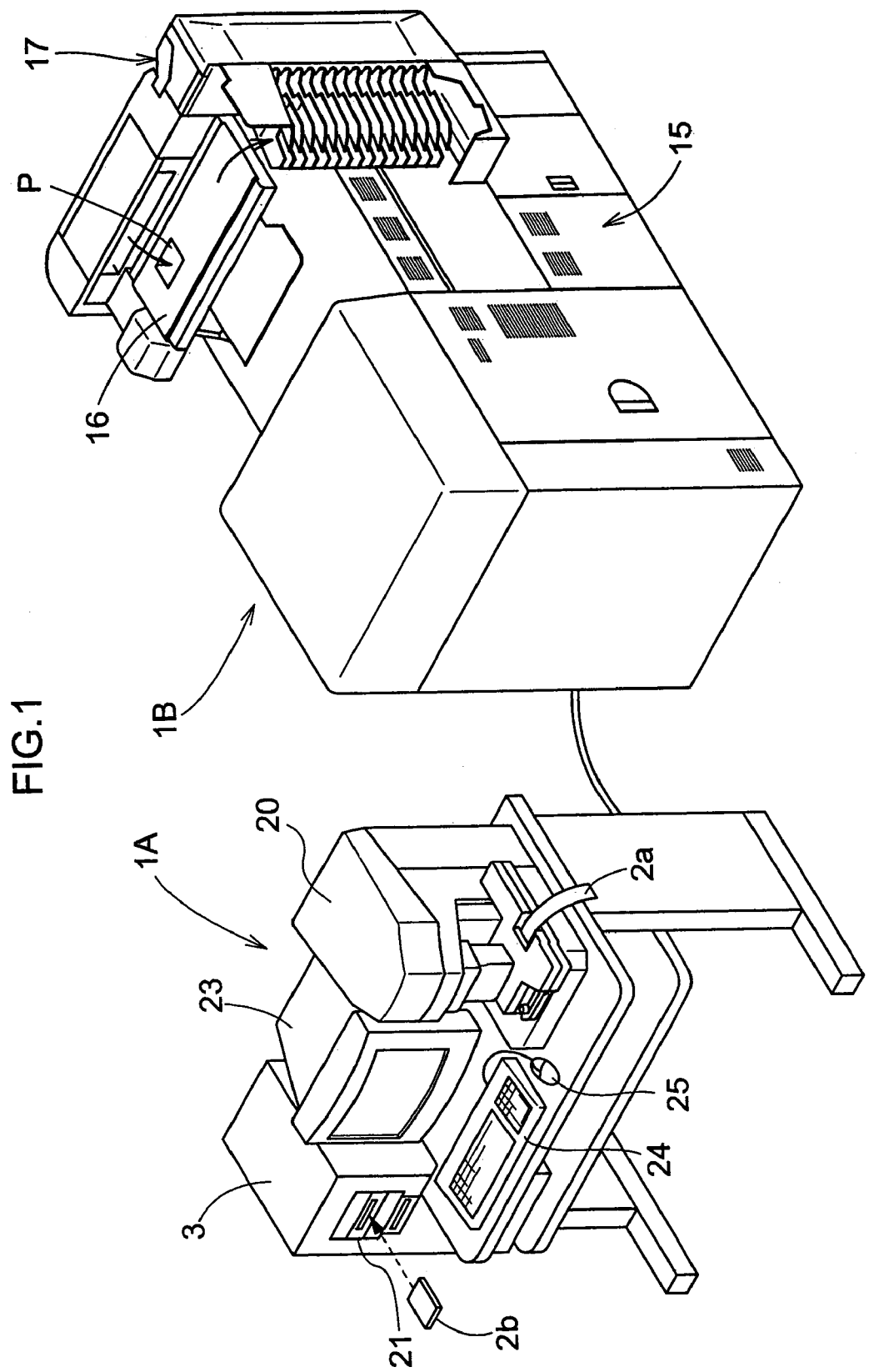
FIG. 1 is a view showing an outer appearance of a photographic printing system employing the white eye correcting technique according to the present invention.
Figure 2:
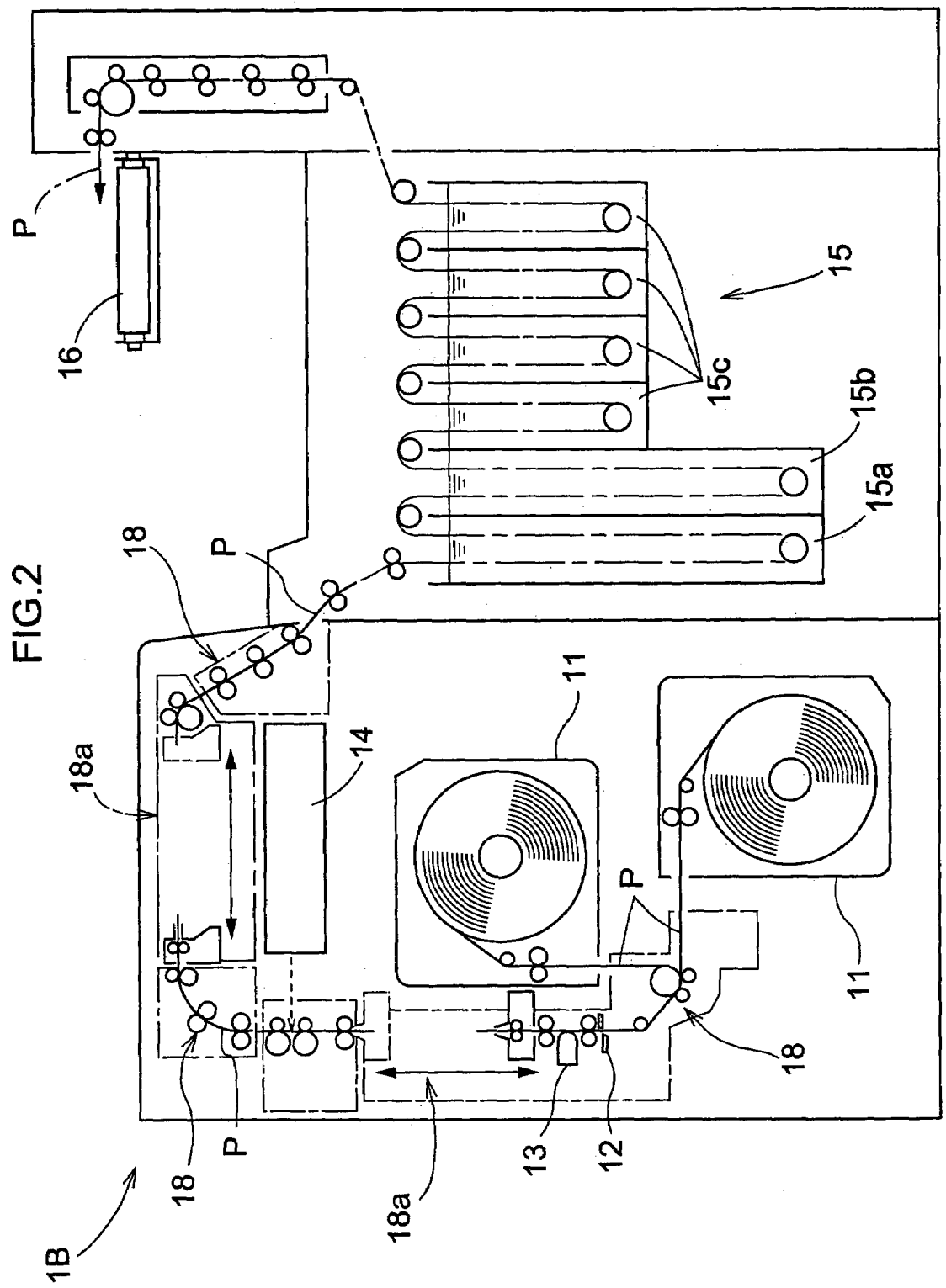
FIG. 2 is a diagram schematically showing a construction of a print station of the photographic printing system.

FIG. 1 shows an outer appearance of a photographic printing system employing the red eye correction technique of the present invention. As shown, this printing system consists mainly of a printing station 1B as a photographic printer for effecting exposure and development on a print paper P and an operating station 1A for processing photographic images taken from a developed photographic film 2a or various image input media such as a memory card 2b for a digital camera and effecting production/transmission of print data to be used in the printing station 1B. This photographic printing system is known also as "digital mini-lab". As best understood from FIG. 2, in the printing station 1B, a print paper P stored in the form of a roll in either one of two print paper magazines 11 is drawn out and cut by a sheet cutter 12 to a print size strip. On this print paper P (or print size strip), a back printing unit 13 prints on its back face, color correction information and various print processing information such as a frame number, and a print exposing unit 14 exposes a front face of each paper P with a photographically recorded image. Then, a plurality of such exposed print papers P are fed into a developing tank unit 15 having a plurality of developing solution tanks for their development. After being dried, the developed print papers P are conveyed by a transverse conveyer 16 to a sorter 17, by which the papers P are sorted according to each customer's order and stacked in a plurality of trays (see FIG. 1).

For transporting the print papers P at a speed adapted or suited for each of the above-described various operations, there is provided a print paper transporting mechanism 18. This print paper transporting mechanism 18 has a plurality of pinch transport roller pairs including chucker type print paper transport units 18a disposed before and after the print exposing unit 14 relative to the print paper transporting direction.

The print exposing unit 14 has line exposure heads for effecting irradiation of laser beams of three primary colors, R (red), G (green) and B (blue) along a main scanning direction of the print paper P which is being transported in a sub scanning direction, based on the print data sent from the operating station 1A. The developing solution tank unit 15 includes a color developing solution tank 15a whish stores therein color developing solution, a bleaching/fixing solution tank 15b which stores therein bleaching/fixing solution and stabilizing solution tanks 15c which store stabilizing solutions therein.

At an upper position of a desk-like console of the operating station 1A, there is disposed a film scanner 20 for obtaining photographic image data ("image data" hereinafter) from the respective photographically exposed frames of the photographic film 2a. Whereas, a media reader 21 for obtaining image date from various types of semiconductor memories, CD-R or the like is incorporated within a general-purpose personal computer which functions as a controller 3 for this photographic printing system. The general-purpose PC is connected also to a monitor 23 for displaying various kinds of information and a keyboard 24 and a mouse 25 which function as operation input devices (pointing devices) employed as an instruction inputting section when various settings or adjustments are to be effected.

Figure 3:
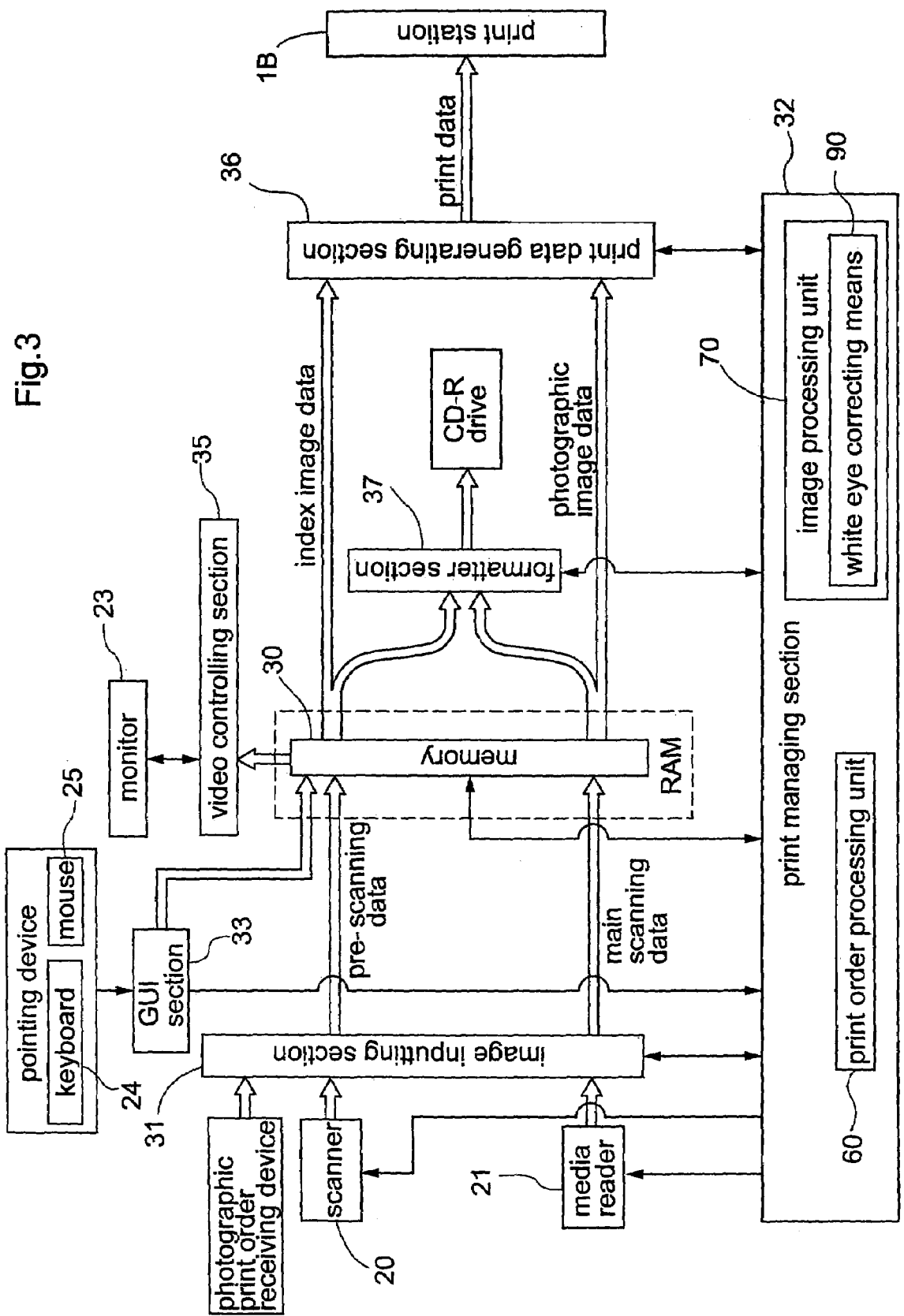
FIG. 3 is a functional block diagram for illustrating functional blocks or sections provided in a controller of the photographic printing system.

The controller 3 for the photographic printing system includes a CPU as a core component thereof and includes also various functional blocks or sections for effecting various operations of the photographic printing system realized in the form of hardware and/or software. Of these functional sections, as shown in FIG. 3, the following sections are of particular relevance to the present invention. An image inputting section 31 is provided for inputting the image data read by the scanner 20 or the media reader 21 and effecting any preparatory operation needed for a subsequence process. A GUI section 33 constitutes a graphic user interface (i.e. GUI) configured for creating a graphically assisted operation screen having various windows, various operation buttons or the like and generating control commands from user's operation inputs (via the keyboard 24, the mouse 25 or the like) effected through such graphic operation screen. A print managing section 32 effects e.g. an image processing operation on the image data transmitted from the image inputting section 31 to a memory 30 in order to generate desired print data according to a control command sent from the GUI section 33 or an operation command directly inputted via e.g. the keyboard 24. A video controlling section 35 generates wide signals for causing the monitor 32 to display a print source image or a simulated image as an expected finished print image during a pre-judge printing operation for e.g. color correction and to display also the graphic data sent from the GUI section 33. A print data generating section 36 generates print data suited for the print exposing unit 14 mounted in the print station ID, based on final image data whose image processing has been completed. A formatter section 37 formats raw image data or the finally processed image data into a format writable in e.g. a CD-R, in accordance with a customer's request.

Referring more particularly to the image inputting section 31, in case the photographic image recording media is a film 2a, this image inputting section 31 transmits scanned data scanned in a pre-scanning mode and a main scanning mode, separately to the memory 30, to effect a preparatory operation suited for each particular purpose. Whereas, in case the photographic image recording media is a memory card 2b, if the inputted image data contains thumbnail image data (low resolution data), the section 31 transmits this thumbnail data to the memory 30 separately from the main data (high resolution data) of the photographic image, so that the thumbnail data may be used for e.g. list (summary) display on the monitor 23. On the other hand, if no thumbnail data are contained therein, the image inputting section 31 creates reduced images from the main data and sent these as thumbnail data to the memory 30. Further, this image inputting section 31 is connected also to a device commonly known as photographic print order receiving device, for automatically receiving a customer's order for prints. Then, when the image inputting section 31 receives print order data relating to a print size, a number of prints to be made, etc., image attribute data relating to photographic condition and image data, the image inputting section 31 transmits the image data to the memory 30, and transmits the print order data and the image attribute data to the print managing section 32, respectively. In the case of an order for standard photos, then, this the print order data relating to e.g. a print size, the number of prints, etc. and also, if necessary, the image attribute data relating to presence/absence of flash photography, the type of camera used, etc. will be sent to the print managing section 32 in response to an operator's input operation to that effect via e.g. the keyboard 24.

The print managing section 32 includes a print order processing unit 60 for managing the print size, the number of prints, etc. and an image processing unit 70 for effecting photo retouching operations such as color correction, filtering (for color softening or sharpness adjustment) on the image data mapped in the memory 30.

Figure 4:
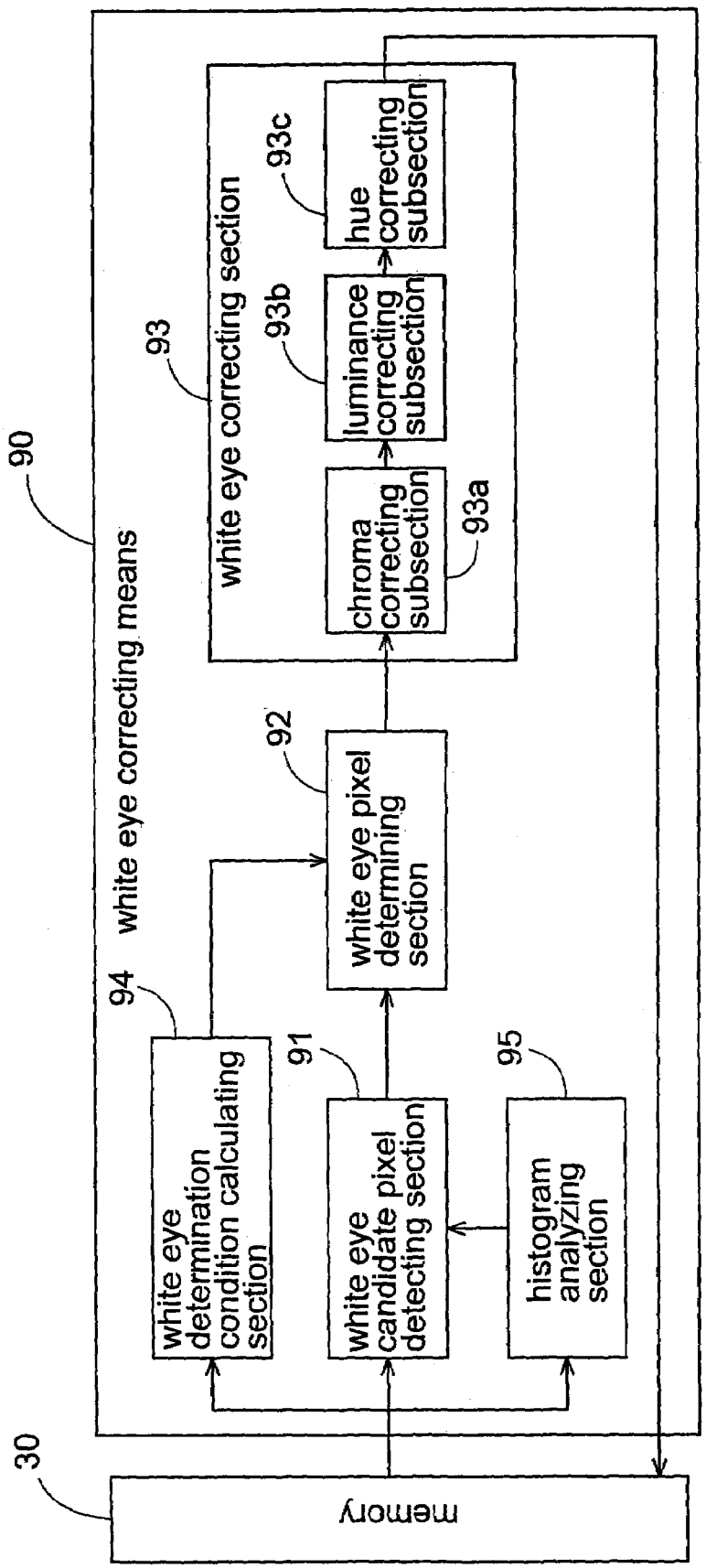
FIG. 4 is a block diagram showing functional blocks of a white eye correcting means shown in FIG. 3.

The above-described image processing unit 70 includes a white eye correcting means 90 implementing the white eye correcting method of the invention. More particularly, as shown in FIG. 4, this white eye correcting means 90 includes a white eye candidate pixel detecting section 91, a white eye pixel determining section 92, a white eye correcting unit 93, a white eye determination condition calculating section 94 and a histogram analyzing section 95. The white eye candidate pixel detecting section 91 is configured to effect the step of a white eye candidate pixel from image data (to be referred to as "eye area data" hereinafter) extracted from the image data, based on a predetermined determination condition. The white eye pixel determining section 92 is configured to effect the step of determining the white eye candidate pixel as a white eye pixel based on a predetermined determination condition. The white eye correcting section 92 is configured to effect the step of effecting white eye correction on the determined white eye pixel by changing its luminance by its luminance correcting subsection 93b. In addition to this luminance correcting subsection 93b, as also shown in FIG. 4, the white eye correcting section 93 further includes a chroma correcting subsection 93a for changing chroma of the white eye pixel prior to the change of luminance thereof and a hue correcting subsection 93c for effecting white eye correction by changing hue of the white eye pixel.

The white eye determination condition calculating section 94 is configured to obtain a condition based on which the white eye candidate pixel is determined as a white eye pixel or not. For instance, this white eye determination condition calculating section 94 includes a step of detecting an iris from the eye area data, so that the white eye pixel determining section 92 (for determining a white eye pixel) may determine each white eye candidate pixel detected based on the predetermined condition as a white eye pixel if this detected candidate pixel is present in an area adjacent the detected iris. The histogram analyzing section 95 is configured to analyze luminance distribution of the image data and then determine the predetermined detection condition based on which the white eye candidate pixel detecting section 91 effects the white eye candidate pixel detection. In this case, the white eye candidate pixel detecting section 91 (for effecting the step of detecting a white eye candidate pixel) effects the detection of white eye candidate pixel based on the detection condition determined based on the particular luminance distribution of the image data.

Figure 5:
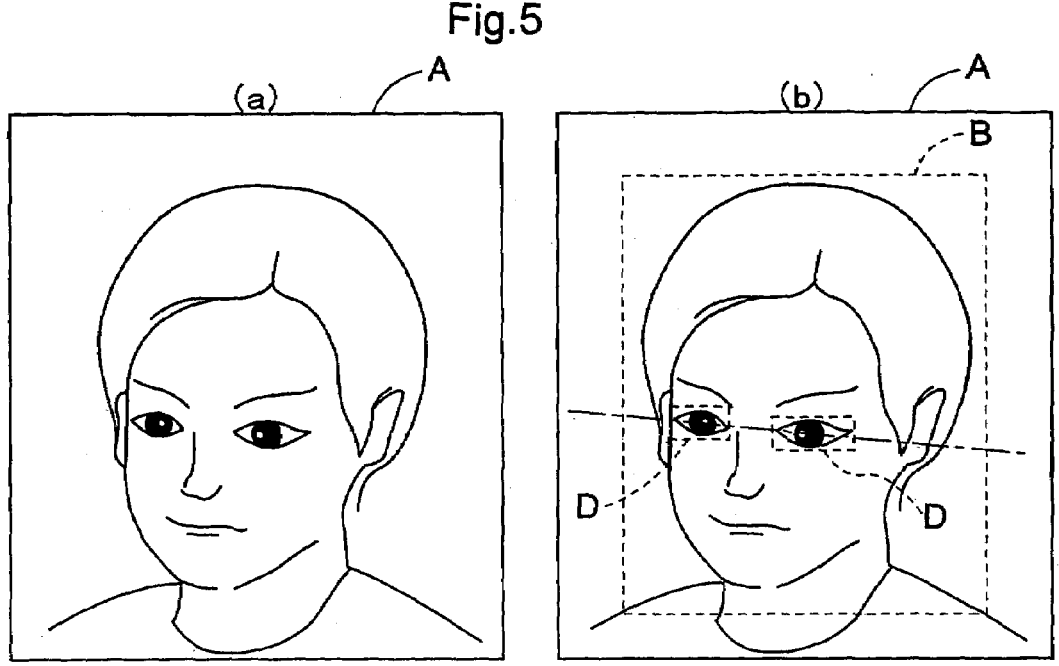
FIG. 5 shows an example of a subject image to be corrected by the white eye correcting technique of the invention.

Next, the operations (respective steps or functions) of the respective operating sections described above will be described in further details. FIG. 5 shows an example of a subject image to be corrected by the white eye correcting method relating to the present invention. First, the image processing unit 70 extracts (retrieves), from e.g. one frame amount of image data A (source data) of an entire photograph stored in the memory 30, an image data area B representing a face. Then, an eye (s) is (are) detected from the face image data area B by means of an image processing utilizing e.g. a face detecting algorithm, thereby to obtain eye area data D. Alternatively, the eye area data D can be obtained manually by an operator through an operation of the keyboard 24 or the mouse 25 with displaying the face image data area B on the monitor 23 for the operator. The eye area data D thus obtained is then subjected to the operation by the white eye correcting means 90.

Incidentally, the description of the instant embodiment employs the language "extracting an image data area". It should be understood that this does not mean that the subject entire image data (e.g. the eye area data D) should necessarily be retained in a work area such as a temporary memory. For instance, while the subject image data is stored within the memory 30 or any other storage, the extracting section can store only address data corresponding to the subject image data, so that corresponding pixels may be retrieved from the memory 30 or the like in "on-demand" fashion for each image processing operation.

Figure 6:
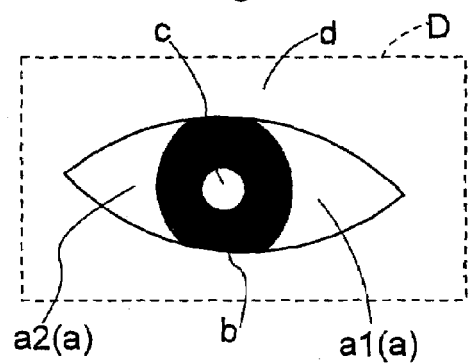
FIG. 6 shows an example of eye area data to be corrected by the white eye correcting technique of the invention.

FIG. 6 shows an example of eye area data D to be subjected to the white eye correcting method of the invention. As shown, the eye area data D includes white eye areas (a) (a1, a2), an iris area (b), a pupil area (c) and a skin area (d). From this eye area data D, a white eye candidate pixel is detected based on the predetermined detection condition. This predetermined detection condition can, for example, be a predetermined minimum luminance value of the pixel. Or, the detection condition can include also condition(s) of hue and/or chroma. Or, each of these conditions can be a predetermined range, rather than a single threshold value. Namely, from the eye area data D, a pixel having luminance, chroma and/or hue value within a predetermined range can be detected as a white eye candidate pixel. For instance, supposing a pixel subjected to the detection ("target pixel" hereinafter) has R, G, B pixel values of Rn, Gn, Bn, then, with using the following window comparator, the detection condition can be expressed e.g. as:

R component lower threshold$\leq$Rn$\leq$R component upper threshold; AND

G component lower threshold$\leq$Gn$\leq$G component upper threshold; AND

B component lower threshold$\leq$Bn$\leq$B component upper threshold.

Incidentally, if the above window comparator is adapted to use a maximum value as the upper threshold, rather than using the upper and lower two thresholds, such modified comparator can be used in case a pixel having pixel values greater than predetermined luminance (brightness) is detected as a white eye candidate pixel.

As described above, a white eye candidate pixel detected based on a pixel value of a target pixel does not necessarily belong in the white eye area (a). Rather, in case light is reflected from the pupil area (c) thus causing this area illuminant and to appear white or the skin area (d) appears white, a pixel from such area too will be detected as a white eye candidate pixel. For this reason, the white eye determining section 92 determines whether each detected white eye candidate pixel is really a white eye pixel, i.e. a pixel belonging in the white eye area (d), or not. This determination is possible for instance, based on distribution pattern of a plurality of such white eye candidate pixels detected. Specifically, a pixel which belongs in the skin area (d) but has been detected as a white eye candidate pixel will be present only sporadically, that is, present without being accompanied by many other such pixels detected in the vicinity thereof. As the pupil area (c) is smaller than the white eye area (a), it is possible to determine only a candidate pixel belonging in the white eye area (a) as a white eye pixel with reliability, provided that a number of such white eye candidate pixels are present with a certain concentration about that candidate pixel.

Figure 7:
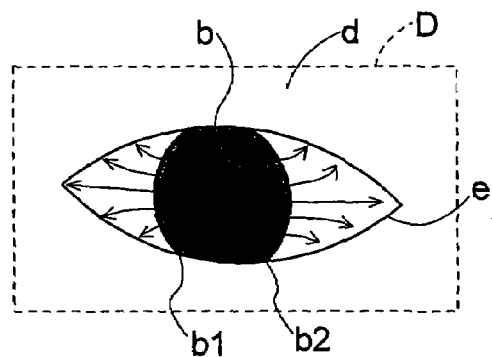
FIG. 7 illustrates an example of a method for determining a white eye pixel to be corrected by the white eye correcting technique of the invention.

The above determination can be made alternatively as follows. Namely, in this case, the white eye determination condition calculating section 94 detects the iris area (b) by using a detection method well-known in the art. Then, the section 94 obtains borders b1 and b1 of the iris area (b) and also the contour of the eyelid as a border (e) as shown in FIG. 7. Then, each of pixels present adjacent the border b1 or b2 will be determined as a white eye pixel one after another along each arrow shown in FIG. 7 as long as this pixel is present inside the border (e). In this, it is possible to "recover", as a white eye pixel, a pixel which belongs in the white eye area (a) but has not been detected as a white eye candidate pixel due to e.g. a noise. In this case, the pixel value of such recovered pixel can be corrected to the threshold value for the white eye candidate pixel, i.e. its detection limit value. Or, as this is actually correction of a noise component, the pixel value of the recovered pixel may be corrected to an average value of pixel values of pixels around it. Incidentally, the iris detection can employ a method which effects a contour enhancement operation on the eye area image data D and then obtains the border coordinates of the iris, eyelid, etc.

Figure 8:
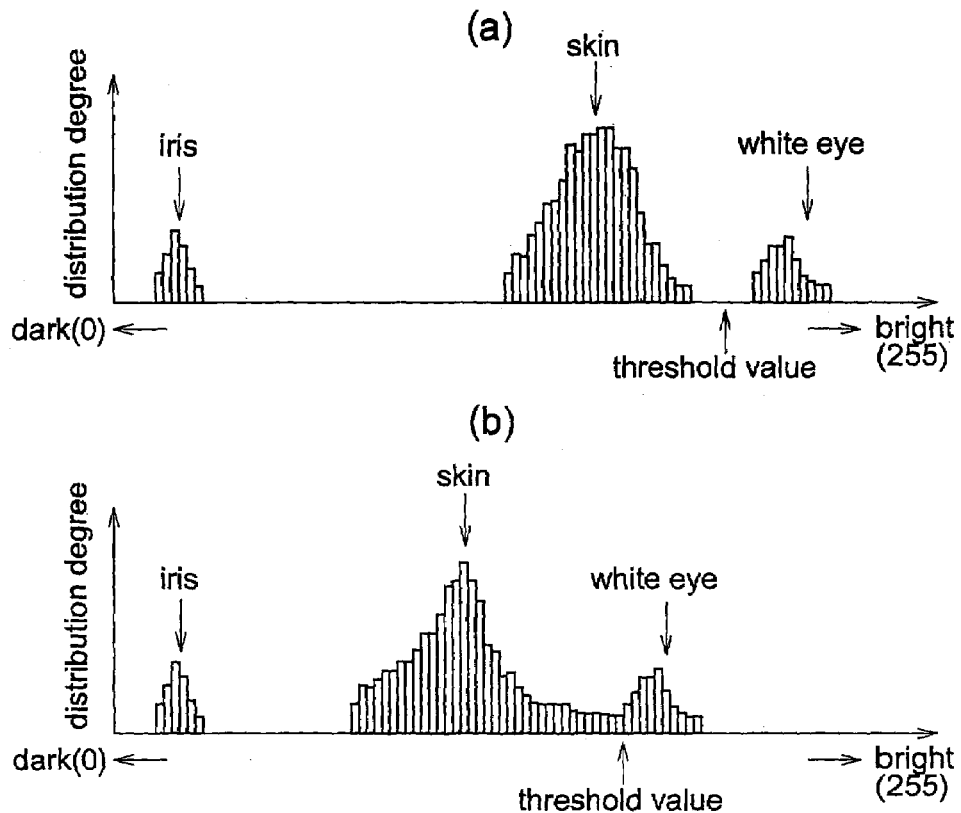
FIG. 8 shows an example of a method for obtaining a luminance condition for detection of a white eye pixel to be corrected by the white eye correcting technique of the invention.

In the above, the threshold value(s) used for detection of white eye candidate pixel is (are) predetermined. Alternatively, this threshold value may be determined according to the luminance distribution pattern of the eye area data D. Namely, the white eye candidate pixel detection may fail when the luminance of the eye area data D as a whole varies, due to e.g. luminance in the surrounding in the site of the photography and/or a certain orientation of the face of the photographic subject. Then, the luminance distribution of the eye are data D is analyzed by the histogram analyzing section 95. And, threshold value information determined based on the result of analysis is transmitted to the white eye candidate pixel detecting section 91, so as to detect white eye candidate pixels having luminance greater than a predetermined value (i.e. luminance within a predetermined range). The above analysis can be realized by a method illustrated in FIG. 8 for example. Namely, FIG. 8 shows an exemplary method for obtaining a luminance condition for detection of a white eye pixel to be corrected by the white eye correcting technique of the invention. FIG. 8(a) shows eye area image data D having high luminance (brightness) overall (overall offset to the higher side). Whereas, FIG. 8(b) shows eye are image data D having low luminance (brightness) overall (overall offset to the lower side). In these graphs, the pixel value of each pixel has a minimum luminance of "0" and a maximum luminance of "255" (FF in the 8-bit representation). And, the group of pixel values on the lower luminance segment represent the pixels belonging in the iris area (b). Another group of pixel values on the intermediate luminance segment represent the pixels belonging in the skin area (d). The other group of pixel values on the higher luminance segment represent the pixels belonging in the white eye area (a). For effective detection of the white eye candidate pixels, it is advantageous to set the threshold value between the skin area (d) and the white eye area (a).

Incidentally, in this embodiment, the histogram analyzing section 95 is incorporated within the white eye correcting means 90. The invention is not limited thereto. Instead, separately from the white eye correction, the luminance distribution may be analyzed within the print managing section 32 or the image processing unit 70, so that only the result of analysis or the threshold value information obtained from the result of the analysis may be transmitted to the white eye correcting means 90. Further, in this, the subject image to be subjected to the distribution analysis may be the low-resolution thumbnail data, rather than the raw or source photographic image data, which is high resolution data. Namely, for the purpose of luminance distribution analysis, detailed image data is not needed. Rather, the use of thumbnail data will provide the advantage of reduction in the time required for analysis. Obviously, the same applies to the analysis to be effected by the histogram analyzing section 95 of the white eye correcting means 90.

Figure 9:
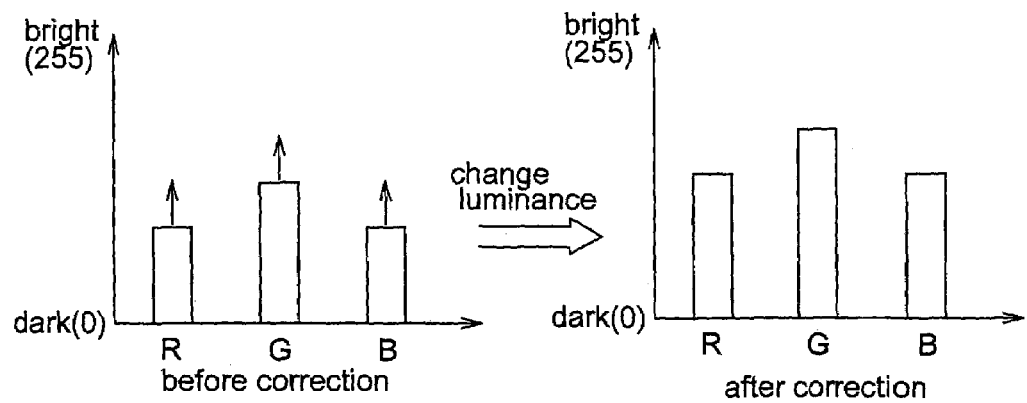
FIG. 9 is an explanatory view of an example of the invention's white eye correcting technique by way of changing luminance.

The white eye pixel thus detected and determined is then corrected by the white eye correcting section 93. Most briefly, the white eye correction section 93 effects this white eye correction by changing the luminance of the white eye pixel. In this particular case, this operation is effected solely by the luminance correcting subsection 93*b* of the white eye correcting section 93. This correction by changing luminance will be explained in greater details by way of an exemplary correction by luminance change according to the invention's white eye correcting method illustrated in FIG. 9. Namely, the correction by luminance change is carried out by increasing/decreasing the pixel values of each pixel in a same direction. The example shown in FIG. 9 is a change for increasing the luminance (brighter). By increasing all of the R, G, B pixel values of the pixel, the luminance is increased. With this change (correction), the luminance of the white eye pixel is enhanced to be brighter, so that the white eye area (a) can be brighter (whiter).

Figure 10:
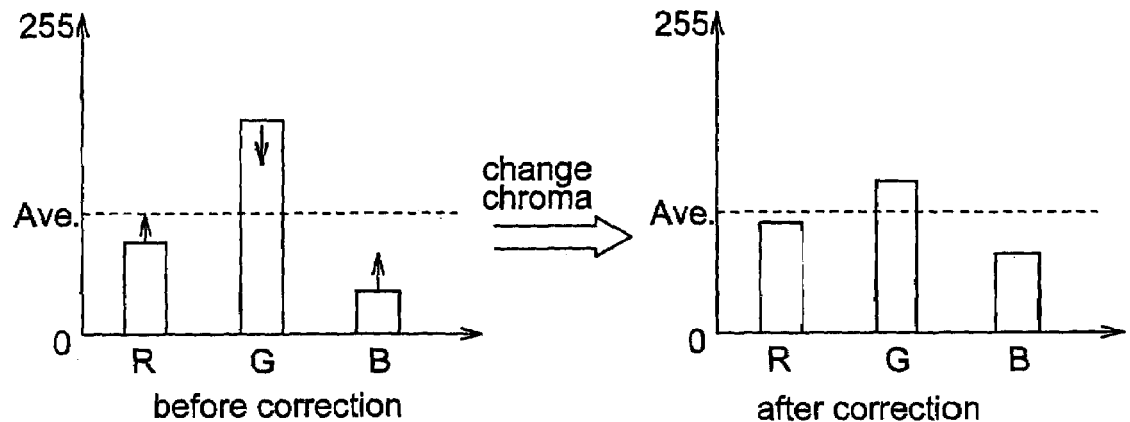
FIG. 10 is an explanatory view of another example of the invention's white eye correcting technique by way of changing chroma.

For even better white eye correction result, prior to the change of luminance of the white eye pixel by the luminance correcting subsection 93*b*, the chroma correcting subsection 93*a* may change the chroma of the white eye pixel. With this, unneeded tint can be eliminated, thus enabling correction of the chroma closer to the achromatic side. This correction by changing chroma will be explained in greater details by way of an exemplary correction by chroma change according to the invention's white eye correcting method illustrated in FIG. 10. Namely, the correction by chroma change is carried out by approximating the respective pixel values of each pixel to an average value thereof. In FIG. 10, a mark Ave denotes an average value of R, G, B pixel values. If the R, G, B pixel values are same, the color of the pixel represented by these pixels becomes either black or white or a grey therebetween, that is, being achromatic. The change of chroma by the chroma correcting subsection 9*a* is not for forcibly rendering the color achromatic. Rather, as shown in FIG. 10, this correction is effected to achieve relative chroma reduction by approximating each pixel to the average value Ave.

Furthermore, the white eye correction is also possible by changing the hue of the white eye pixel by the hue correcting subsection 93*c*. For obtaining natural appearance of white eye, this is possible by changing the color to slightly bluish.

Figure 11:
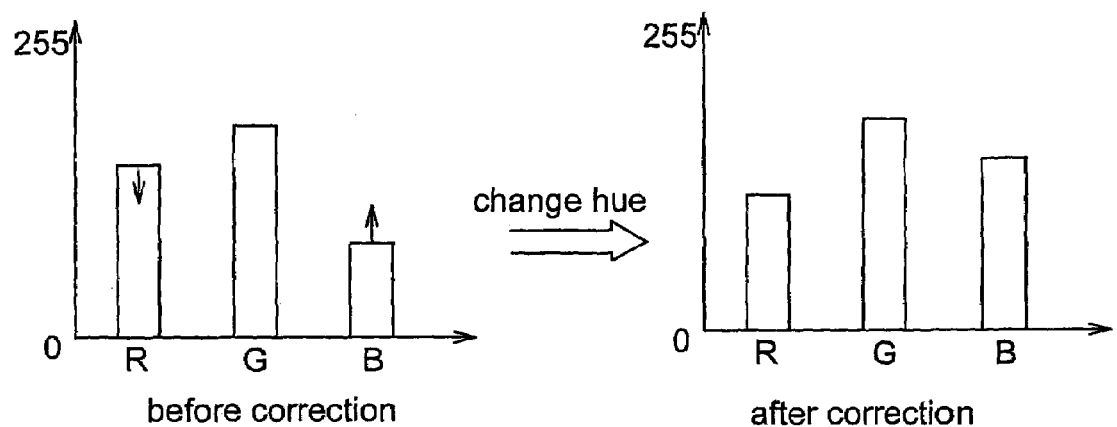
FIG. 11 is an explanatory view of a still another example of the invention's white eye correcting technique by way of changing hue.

Then, the hue correcting subsection 93*c* effects hue correction. The correction by way of hue chance according to the invention's white eye correcting technique will be described next with reference to an example thereof illustrated in FIG. 11. For instance, in order to cause a target pixel to appear slightly bluish, this can be done by either reducing the R pixel value or increasing the B pixel value. Or, both of these operations can be carried out as shown in FIG. 11.

In the foregoing embodiment, there have been described the three types of white eye correction in the white eye correcting section 93 effected by the chroma correcting subsection 93*a*, the luminance correcting subsection 93*b* and the hue correcting subsection 93*c*, respectively. It is not absolutely needed to effect all of these operations. Only one or two of them may be carried out. However, for the best result, all of these three types of correction should be effected. And, in that case, as illustrated in FIG. 4, it is advantageous to effect these operations in the order of the chroma correcting subsection 93*a*, the luminance correcting subsection 93*b* and the hue correcting subsection 93*c*. Namely, first, the chroma correcting subsection 93*a* corrects the color to the achromatic side, thereby to eliminate unnecessary tint. Then, the luminance correcting subsection 93*b* changes the pixel value to increase the whiteness. Finally, the hue correcting subsection 93*c* adds slight blueness to the pixel whose unnecessary tint has been eliminated. By eliminating unnecessary tint first, it becomes easier to achieve the whiteness improvement to be effected next by the luminance correction. Further, by correcting the hue to slightly bluish after the improvement of whiteness, it becomes easier to obtain the effect of bluish coloring.

Figure 12:
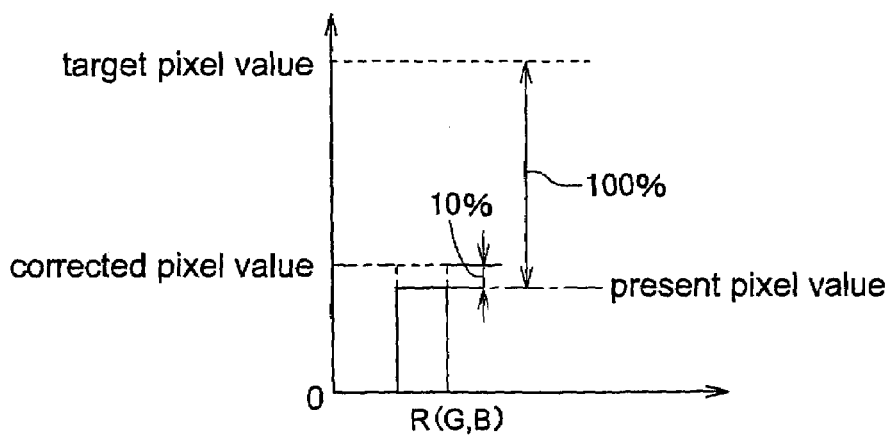
FIG. 12 is an explanatory view of a still another example of the invention's white eye correcting technique by way of changing pixel value.

Next, with reference to FIG. 12 illustrating an example of change of pixel value by the invention's white eye correcting method, the method of changing the pixel value for each of the above described types of correction will be described. In this white eye correction (the white eye correcting step), the correction is effected by a predetermined ratio relative to a difference between the white eye pixel value and the target pixel value as shown in this example of FIG. 12. With this, it is possible to avoid creation of unnatural impression which would occur otherwise due to excessive correction. This is advantageous also for allowing the correction to be effected with maintaining e.g. the gradation of the original image. This ratio relative to the difference may be determined for each type of correcting operation. For instance, the chroma correcting subsection 93*a* can carry out 10% correction, the luminance correcting subsection 93*b* can carry out 20% correction and the hue correcting subsection 93*c* can carry out 10% correction, respectively.

Further, the above-described proportion of the corrections need not be fixed, but can be variably determined case by case for each image data (for each photographic frame image). And, the operator may input this by way of the user operating means (keyboard 24, mouse 25, etc.). Or, this can be calculated within the print managing section 32 or the image processing unit 70, independently of the white eye correcting operation. Needless to say, a correction ratio calculating section can be added to the functional blocks of the white eye correcting means shown in FIG. 4. In case, the ratio is calculated by such correction ratio calculating section or within the print managing section 32 or the image processing unit 70, it is possible to employ the low resolution thumbnail data, rather than the high resolution source photographic image data. Namely, for the purpose of correction ratio calculation, detailed image data is not needed. Rather, the use of thumbnail data will provide the advantage of reduction in the time required for the operation.

The foregoing embodiment employs R, G, B as the color space for representing image data. The invention is not limited thereto. The white eye correction of the invention is possible also with using any other color space such as CMYK, L*a*b* or XYZ.

After completion of the white eye correction on all white eye pixels, the corrected white eye pixels are written back into the memory 30 to be synthesized to image data of original format. This can be done by e.g. substitution of the image data stored within the memory 30 or any other storage by the corresponding corrected pixels.

The image data which have been subjected to an appropriate degree of white eye correction will be then subjected to a necessary additional image processing and transmitted to the print exposing unit 14, which then exposes a print paper P based on this print data, thereby to produce a finished print.

In the foregoing embodiment, there is employed the so-called silver salt photographic printing technique wherein the print station 1B effects exposure of the print paper P with a photographic image at the print exposing unit 14 and then develops a plurality of developing operations of this exposed print paper P. Needless to say, in this invention, the print station 1B is not limited to such type. Instead, various photographic printing systems such as an ink jet printing for forming an image by jetting ink on to a film or a paper, a heat transfer printing method using a heat-sensitive sheet, etc.

The present invention can be used for a variety of applications as a technique to be implemented by any image processing apparatus which requires detection and correction of white eye pixels from photographic image data. For instance, the invention's technique is applicable to a digital camera, a digital video camera, a mobile telephone having a camera function, a printer, a driver software or utility software therefor.

I claim:

1. A method for correcting white eye in image data, comprising the steps of:
    detecting a white eye candidate pixel from an eye extracted from the image data based on a predetermined detection condition;
    determining said white eye candidate pixel as a white eye pixel based on a predetermined determination condition; and
    effecting white eye correction of the determined white eye pixel by changing its luminance.

2. The method according to claim 1, further comprising the step of detecting an iris from the image data, and at said white eye pixel determining step, wherein said white eye candidate pixel is determined as the white eye pixel if said white eye candidate pixel has been detected from an area adjacent said iris.

3. The method according to claim 1, wherein said white eye correcting step is effected by changing a chroma of the white eye pixel first prior to the change of its luminance.

4. The method according to claim 3, wherein the white eye correcting step is effected by changing a hue of the white eye pixel.

5. The method according to claim 1, wherein the white eye correcting step effects the white eye correction by a ratio determined based on a difference between a predetermined pixel value of a target pixel and a pixel value of each white eye pixel.

6. The method according to claim 1, wherein said predetermined detection condition employed at said step of detecting a white eye candidate pixel is predetermined based on a luminance distribution of the image data.

7. A computer-readable medium comprising computer-executable instructions for correcting white eye in image data, said instructions comprising the steps of:
    detecting a white eye candidate pixel from an eye extracted from the image data based on a predetermined detection condition;
    determining said white eye candidate pixel as a white eye pixel based on a predetermined determination condition; and
    effecting white eye correction of the determined white eye pixel by changing its luminance.

8. An image processing apparatus for correcting white eye in image data, the apparatus comprising:
    a white eye candidate pixel detecting section for detecting a white eye candidate pixel from an eye extracted from the image data based on a predetermined detection condition
    a white eye pixel determining section for determining said white eye candidate pixel as a white eye pixel based on a predetermined determination condition; and
    a white eye correcting section for effecting white eye correction of the determined white eye pixel by changing its luminance.

9. The apparatus according to claim 8, further comprising: a white eye determination condition calculating section for detecting an iris from the image data;
    wherein said white eye pixel determining section determines said white eye candidate pixel as the white eye pixel if said white eye candidate pixel has been detected from an area adjacent said iris.

10. The apparatus according to claim 8, wherein said white eye correcting section effects the white eye correction by changing a chroma of the white eye pixel first prior to the change of its luminance.

11. The apparatus according to claim 10, wherein said white eye correcting section effects the white eye correction by changing a hue of the white eye pixel.

12. The apparatus according to claim 8, wherein said white eye correcting section effects the white eye correction by a ratio determined based on a difference between a predetermined pixel value of a target pixel and a pixel value of each white eye pixel.

13. The apparatus according to claim 8, wherein said white eye candidate pixel detecting section detects a white eye candidate pixel based on a luminance distribution of the image data.

* * * * *